United States Patent
Lennen

(10) Patent No.: US 9,476,988 B2
(45) Date of Patent: Oct. 25, 2016

(54) METHOD, APPARATUS AND SYSTEM FOR REDUCING POWER CONSUMPTION IN GNSS RECEIVERS

(71) Applicant: Gary Lennen, Cupertino, CA (US)

(72) Inventor: Gary Lennen, Cupertino, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 811 days.

(21) Appl. No.: 13/891,019

(22) Filed: May 9, 2013

(65) Prior Publication Data

US 2014/0333477 A1 Nov. 13, 2014

(51) Int. Cl.
| | |
|---|---|
| G01S 19/26 | (2010.01) |
| G01S 19/34 | (2010.01) |
| G01S 19/24 | (2010.01) |
| G01S 19/36 | (2010.01) |
| G01S 19/37 | (2010.01) |

(52) U.S. Cl.
CPC ............... *G01S 19/34* (2013.01); *G01S 19/24* (2013.01); *G01S 19/36* (2013.01); *G01S 19/37* (2013.01)

(58) Field of Classification Search
CPC ........ G01S 19/26; G01S 19/42; G01S 19/23; G01S 19/33; G01S 19/34
USPC ............ 342/357.65, 357.74, 357.25, 357.62, 342/357.73
See application file for complete search history.

(56) References Cited

U.S. PATENT DOCUMENTS

| | | | |
|---|---|---|---|
| 5,923,287 A | 7/1999 | Lennen | |
| 6,133,871 A | 10/2000 | Krasner | |
| 6,407,699 B1 * | 6/2002 | Yang | G01S 19/21 342/357.59 |
| 7,847,726 B2 | 12/2010 | Jia et al. | |
| 8,134,502 B2 | 3/2012 | Lennen | |
| 2007/0229352 A1 * | 10/2007 | Chen | G01S 19/28 342/357.67 |
| 2009/0040103 A1 * | 2/2009 | Chansarkar | G01S 19/37 342/357.74 |
| 2009/0115657 A1 * | 5/2009 | Cheng | G01S 19/05 342/357.42 |
| 2010/0103038 A1 | 4/2010 | Yeh et al. | |
| 2011/0103432 A1 * | 5/2011 | Tangudu | H04B 1/7103 375/150 |
| 2012/0274509 A1 | 11/2012 | Tsai et al. | |

FOREIGN PATENT DOCUMENTS

EP 2113782 A 11/2009

* cited by examiner

*Primary Examiner* — Harry Liu
(74) *Attorney, Agent, or Firm* — Renaissance IP Law Group LLP

(57) ABSTRACT

Inventive aspects include a method, apparatus, and system for reducing power consumption in GNSS receivers. Such may include receiving timing and accuracy parameters, processing pre-positioning information in preparation for signal acquisition or signal track, determining whether a plurality of satellites are in-view, applying an ON signal to one or more components of an analog signal processing section and to one or more components of a digital signal processing section, and within a dynamic time window, acquiring signals of the plurality of in-view satellites and simultaneously applying, in real-time, signal sensing logic to the acquired signals, until determining that a position fix of the electronic receiver is obtained. Responsive to the determination that the position fix is obtained, an OFF signal may be applied to the one or more components of the analog signal processing section and to the one or more components of the digital signal processing section.

23 Claims, 10 Drawing Sheets

METHOD, APPARATUS AND SYSTEM FOR REDUCING POWER CONSUMPTION IN GNSS RECEIVERS

BACKGROUND

The present inventive concepts relate to Global Navigation Satellite System (GNSS) receivers, and more particularly to reducing or otherwise minimizing power consumption in GNSS receivers.

Thousands of satellites have been launched into space. Some of these satellites are used in satellite navigation systems. A satellite navigation system having global coverage is referred to as a global navigation satellite system (GNSS). The United States NAVSTAR Global Positioning System (GPS) and the Russian GLONASS are each examples of an operational GNSS.

Satellite navigation systems provide location and time information. Small mobile electronic devices on Earth having embedded GNSS receivers can acquire a "position fix" when an unobstructed line of sight is available to multiple satellites. Such devices can include, for example, a smart phone, a camera, a mobile computer, a GPS logger, a mobile device, and the like. Power consumption of a GNSS receiver is a substantial portion of the overall power budget of the device when in use. High power consumption is problematic because mobile devices are generally powered using batteries, and battery life of the devices is impacted by processing activities associated with obtaining the position fix.

Conventional GNSS receiver technology includes techniques that sequence, usually periodically, through GNSS receiver ON/OFF cycles. For example, the GNSS receiver may implement "trickle power" or active continuous track (ACT) procedures. This may involve, for example, turning the GNSS receiver on for a fixed period of time such as 10 milliseconds (ms), then off for a fixed period of time such as 2 ms, and so forth. The repetitive on and off cycling occurs even when a position fix is not obtained. In other words, the GNSS receiver may fail to gain the orientation when turned on, which in some cases may result in incorrect assumptions. In other cases, the conventional approaches may leave the GNSS receiver turned on too long, as much as 99 ms or more, even while in the presence of strong satellite signals. Other approaches involve attempting to observe the signal strength of one satellite at a time. Such approaches result in disadvantageous resource waste and unnecessary power consumption.

What is needed is an improved apparatus and method for reducing power consumption in electronic receivers, and in particular, GNSS receivers. Together with related inventive concepts disclosed herein, these and other limitations in the prior art are addressed.

BRIEF SUMMARY

Inventive concepts may include a method for reducing power consumption in GNSS receivers. Such method may include, for example, receiving timing and accuracy parameters, processing pre-positioning information in preparation for signal acquisition or signal track, determining whether a plurality of satellites are in-view, applying an ON signal to one or more components of an analog signal processing section and to one or more components of a digital signal processing section, and within a dynamic time window, acquiring signals of the plurality of in-view satellites and applying signal sensing logic to the acquired signals, until determining that a position fix of the electronic receiver is obtained. Responsive to the determination that the position fix is obtained, an OFF signal may be applied to the one or more components of the analog signal processing section and to the one or more components of the digital signal processing section. The dynamic time window may be a non-fixed period of time.

Applying the signal sensing logic may further include receiving digital information about N tracked satellites, wherein the N tracked satellites correspond to the plurality of in-view satellites, estimating at least one of range and Doppler error for each of the N tracked satellites, filtering the N tracked satellites to K satellites, where K is less than or equal to N, computing dilution of precision based on the K satellites, computing position, velocity, and time solution based on the K satellites, computing estimated position error, and determining whether the estimated position error is less than or equal to a predefined threshold.

According to features and principles of the present inventive concepts, a computing system may include a system bus, memory connected to the system bus, a user interface associated with the system bus and the memory, and a GNSS receiver including an RF processing section connected to a digital signal processing section. The digital signal processing section may be configured to receive digital information about N tracked satellites from the RF processing section. The digital signal processing section may further include a satellite rejection filter configured to filter the N tracked satellites to K satellites, an ON/OFF signal generator configured to generate one or more ON/OFF control signals, and a satellite acquisition, tracking, and measurement section configured to apply, responsive to the one or more ON/OFF control signals, within a dynamic time window, signal sensing logic to acquired signals of the K satellites.

Certain of the inventive features may be best achieved by implementing them in a processor such as within ARM processor core. Other types of processors or application specific integrated circuits (ASICs) can implement the inventive principles disclosed herein. The inventive concepts may be implemented within processors of a variety of mobile devices such as smart phones, tablets, notebook computers, or the like, or in a variety of stationary devices such as desktop computers, routers, or the like.

The inventive principles described and illustrated herein provide a significant reduction in power consumption while maintaining high performance.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
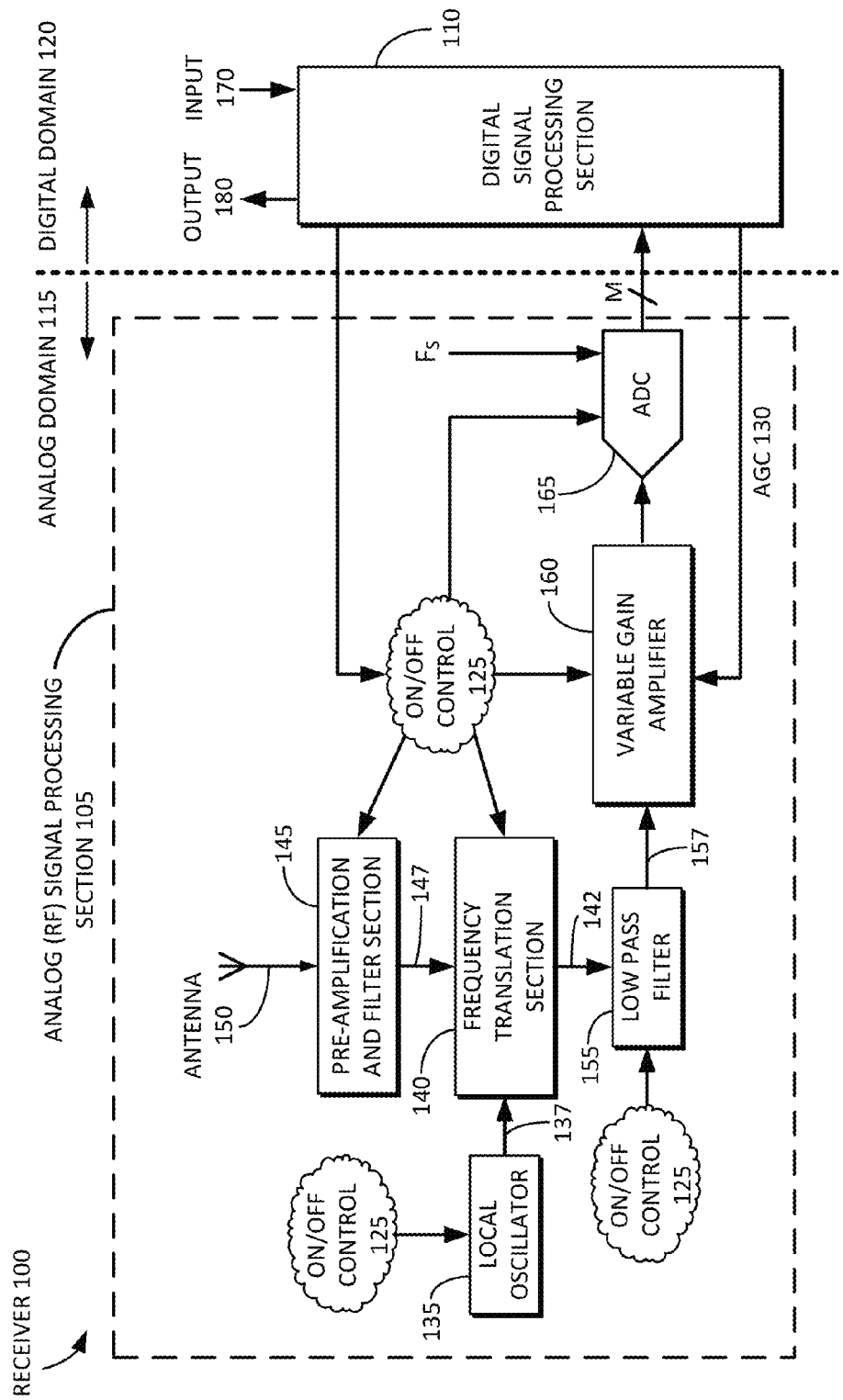
FIG. 1 is an example block diagram of an electronic GNSS receiver including an analog signal processing section and a digital signal processing section in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Power consumption attributed to GNSS receivers, when in use, is a substantial portion of the overall power consumption of electronic devices such as mobile smart phones, GPS loggers, and other location-aware mobile devices. Embodiments of the inventive concept described herein reduce or otherwise minimize GNSS receiver "on time" for given position parameter(s), velocity parameter(s), and/or time estimate accuracy parameter(s). Although the term "GNSS receiver" is generally used herein, such term is not necessarily intended to limit the embodiments to solely GNSS related systems, but rather, it will be understood that the disclosed embodiments of the inventive concept are applicable to any kind of receiver capable of receiving multiple satellite signals, and any kind of satellite navigation system, whether globally or regionally implemented, or any combination thereof.

Embodiments of the inventive concept reduce the power consumption by implementing intelligent ON/OFF signal control, and when turned on, applying unique signal sensing logic to signals received from in-view satellites. The term "in-view" is used herein broadly to encompass any satellite above the horizon having a signal of sufficient strength to be detectable by an electronic GNSS receiver. The "in-view" satellites typically have an unobstructed line of sight to the GNSS receiver, but this need not be the case. Moreover, the satellites need not be visible to a human being to be considered "in-view."

FIG. 1 is an example block diagram of an electronic GNSS receiver 100 including an analog (RF) signal processing section 105 within an analog domain 115 and a digital signal processing section 110 within a digital domain 120 in accordance with embodiments of the inventive concept.

The analog (RF) signal processing section 105 receives ON/OFF control signals 125 generated by the digital signal processing section 110. Both the RF and digital signal processor sections can be turned ON or OFF by the ON/OFF control signals 125. In addition, sub-blocks or components within the RF and digital sections can be turned ON or OFF. The ON/OFF control signals 125 are described in further detail below.

Antenna 150 may be connected to pre-amplification and filter section 145. The pre-amplification and filtering section 145 can pre-amplify, filter and produce a high-frequency signal 147 between, for example, one and two gigahertz (GHz). The high-frequency signal 147 may have a frequency, for example, of 1.5 GHz or thereabout. A frequency translation section 140 can receive the high-frequency signal 147 from the pre-amplification and filter section 145. The frequency translation section can also receive a local oscillator signal 137 from a local oscillator 135.

The frequency translation section 140 can produce a signal 142 having a lower frequency than the high-frequency signal 147. For example, the signal 142 can have a frequency of 4 megahertz (MHz) or thereabout. A low pass filter 155 can receive and filter the lower-frequency signal 142 and produce a filtered signal 157. A variable gain amplifier 160 can receive the filtered signal 157. The variable gain amplifier 160 can adjust the gain or otherwise modulate the filtered signal 157. The variable gain amplifier 160 can receive an active gain control (AGC) signal 130, which is generated by the digital signal processing section 110.

An analog-to-digital converter (ADC) 165 can receive and digitize a signal received from the variable gain amplifier 160. The ADC 165 can receive a clock sampling frequency input $F_S$. The ADC 165 can output M digitized signals. In other words, the ADC 165 can be sampled with M-bits, where M may be, for example, 3, 5, or 8 bits. In general, GNSS systems are all received in the same frequency band such that all satellites in view will be present in the stream of M-bit digital samples (i.e., a stream of M-bit numbers, one per $F_S$ clock). The M-bit data stream may contain information pertaining to, for example, 1, 2, 3, 4, 5 . . . 20, or more, satellite(s) depending on how many satellites are in-view.

The digital signal processing section 110 can receive input 170 and/or transmit output 180. The input 170 can include, for example, an "external position fix now" signal, position accuracy parameters, and the like. Such input information can provide information that is useful for determining when to turn the receiver 100 (or components thereof) ON and/or when to turn the receiver 100 (or components thereof) OFF. Such input information can provide information pertaining to position accuracy requirements. Such input information can be received once based on a single position fix request or periodically (e.g., once per second) for continuous navigation. The output 180, on the other hand, can include satellite range measurements, position ready signals, position not-ready signals, and the like.

Figure 2:
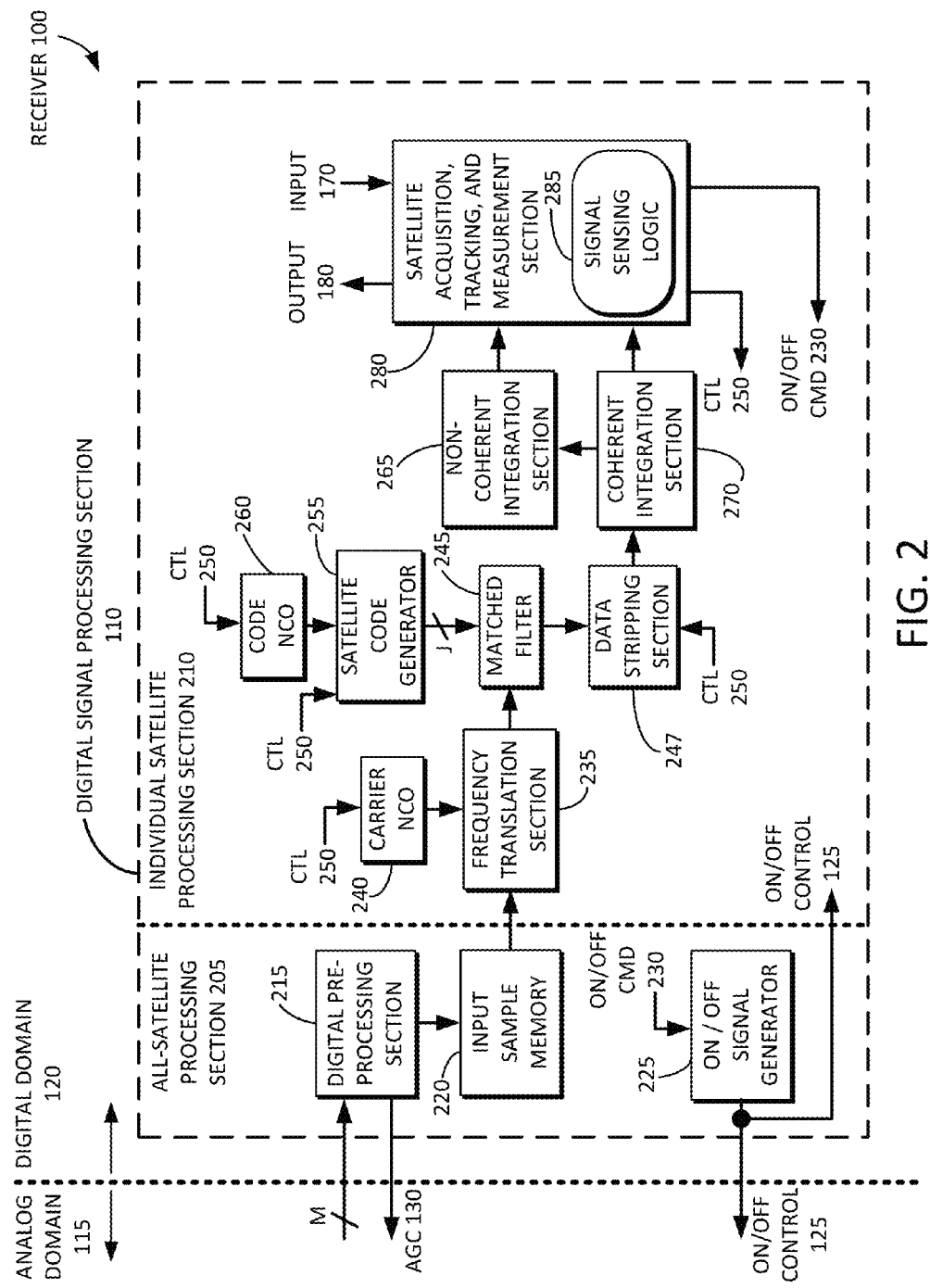
FIG. 2 is an example block diagram of additional details of the digital signal processing section of FIG. 1.

FIG. 2 is an example block diagram of additional details of the digital signal processing section 110 of FIG. 1. The digital signal processing section 110 includes an all-satellite processing section 205 and an individual satellite processing section 210. The all-satellite processing section 205 can simultaneously process signals from all in-view satellites. The individual satellite processing section 210 can individually process signals from each of the in-view satellites. Although the term "individually process" is used here, such term can refer to interleaved processing such that signals from multiple satellites are essentially simultaneously processed in real-time.

The all-satellite processing section 205 includes an ON/OFF signal generator 225. The ON/OFF signal generator 225 can receive an ON/OFF command 230 from a satellite acquisition, tracking, and measurement section 280. The ON/OFF signal generator 225 can generate one or more ON/OFF control signals 125, which can turn ON and OFF the RF signal processing section 105 (or one or more components thereof), and/or turn ON and OFF the digital signal processing section (or one or more components thereof).

The all-satellite processing section 205 also includes a digital pre-processing section 215, which can receive the sampled M-bit information about the N in-view and/or tracked satellites. The digital pre-processing section 215 can generate the AGC 130 signal mentioned above. An input sample memory 220 is connected to the digital pre-processing section 215, and can receive and store pre-processed samples from the digital pre-processing section 215.

A frequency translation section 235 can receive the stored samples from the input sample memory 220. The frequency translation section 235 receives information from a carrier numeric controlled oscillator (NCO) 240. The frequency translation section 235 uses the NCO information to translate the frequency of the stored samples.

A matched filter 245 is connected to the frequency translation section 235. The matched filter 245 receives translated information from the frequency translation section 235. The matched filter 245 also receives satellite code information from a satellite code generator 255, which itself receives NCO information from a code NCO 260. The operation of the matched filter 245 is further described below with reference to the flow diagrams. The satellite code information generated by the satellite code generator 255 can include, for example, J signals. The matched filter 245 is a device for computing the mathematical operation of correlation between two signals.

The matched filter 245 outputs the filtered information, which is received by a data stripping section 247. The data stripping section 247 can remove unnecessary data from the filtered information. The information is then processed by the coherent integration section 270 and/or the non-coherent integration section 265. The satellite acquisition, tracking, and measurement section 280 is connected to the coherent integration section 270 and the non-coherent integration section 265 and is configured to receive information from these sections.

The satellite acquisition, tracking, and measurement section 280 includes signal sensing logic 285. The signal sensing logic 285 can simultaneously apply, in real-time, certain logic and/or algorithms to signals of the satellites within a dynamic time window until a position fix is determined to be obtained. The dynamic time window is a non-fixed period of time. When turned ON, the receiver can continuously monitor whether it has enough information to determine if it has satisfied the position accuracy parameters. In other words, within the dynamic time window, signals of multiple in-view or tracked satellites can be acquired and the signal sensing logic can be applied to the acquired signals—until it is determined that a position fix of the receiver is obtained.

The satellite acquisition, tracking, and measurement section 280 can generate one or more control signals 250, which can control, for example, the carrier NCO 240, the code NCO 260, and/or the data stripping section 250, among other components of the digital signal processing section 110.

The components of the receiver 100 are turned on for as little time as needed to obtain the position fix, and then they are turned off. In some cases, the components are turned on for 1 ms or less, then turned off, which is as little as $\frac{1}{1000}$ of a typical time. Moreover, in accordance with embodiments of the inventive concept, the samples are analyzed in real-time—as opposed to gathering and analyzing the samples later. Gathering and analyzing samples later prolongs the obtaining of the position fix. By analyzing the gathered samples in real-time until a position fix is obtained, the receiver 100 has the advantage of instant access to multiple real-time data points, which enable the receiver to more quickly and efficiently obtain the position fix. In addition, the overall time spent is reduced in which the components of the receiver 100 are turned ON. Consequently, the power consumption of the receiver 100 is reduced.

The signal sensing logic 285 can simultaneously process information for all possible GNSS signals, including for example GPS, GLONASS, GALILEO, COMPASS, QZSS, SBAS, and the like, from all detected in-view satellites. This statistically improves the chances of shortening the GNSS receiver ON time. In some embodiments, the signal sensing logic can simultaneously process information for a sub-set or a filtered set of GNSS signals. Contrary to conventional receiver systems that make selections as to which GNSS systems to track, the sensing logic described herein can make use of all available signals, and in this manner, reduce the time for obtaining a position fix, which in turn reduces power consumption.

The signal sensing logic 285 can include a satellite rejection filter, which performs a separate and fundamentally different function than the matched filter 245. The satellite rejection filter reduces the number of satellites available for potential use in the navigation solution by detecting whether the satellite track can be "trusted." Reasons not to trust a satellite signal include, for example, that it is actually a cross correlation with another satellite's code or that it is actually tracking an interfering source such as a narrowband jammer. As such, corrupted satellite tracks can be prevented from corrupting the navigation solution. By way of a further example, N in-view or tracked satellites can be filtered to K satellites, where K is less than or equal to N. In other words, the satellite rejection filter can reject certain satellites due to interference tracking, cross correlation track, or the like, as further described below.

These and other aspects of the signal sensing logic are further described with reference to flow diagrams described below.

Figure 3:
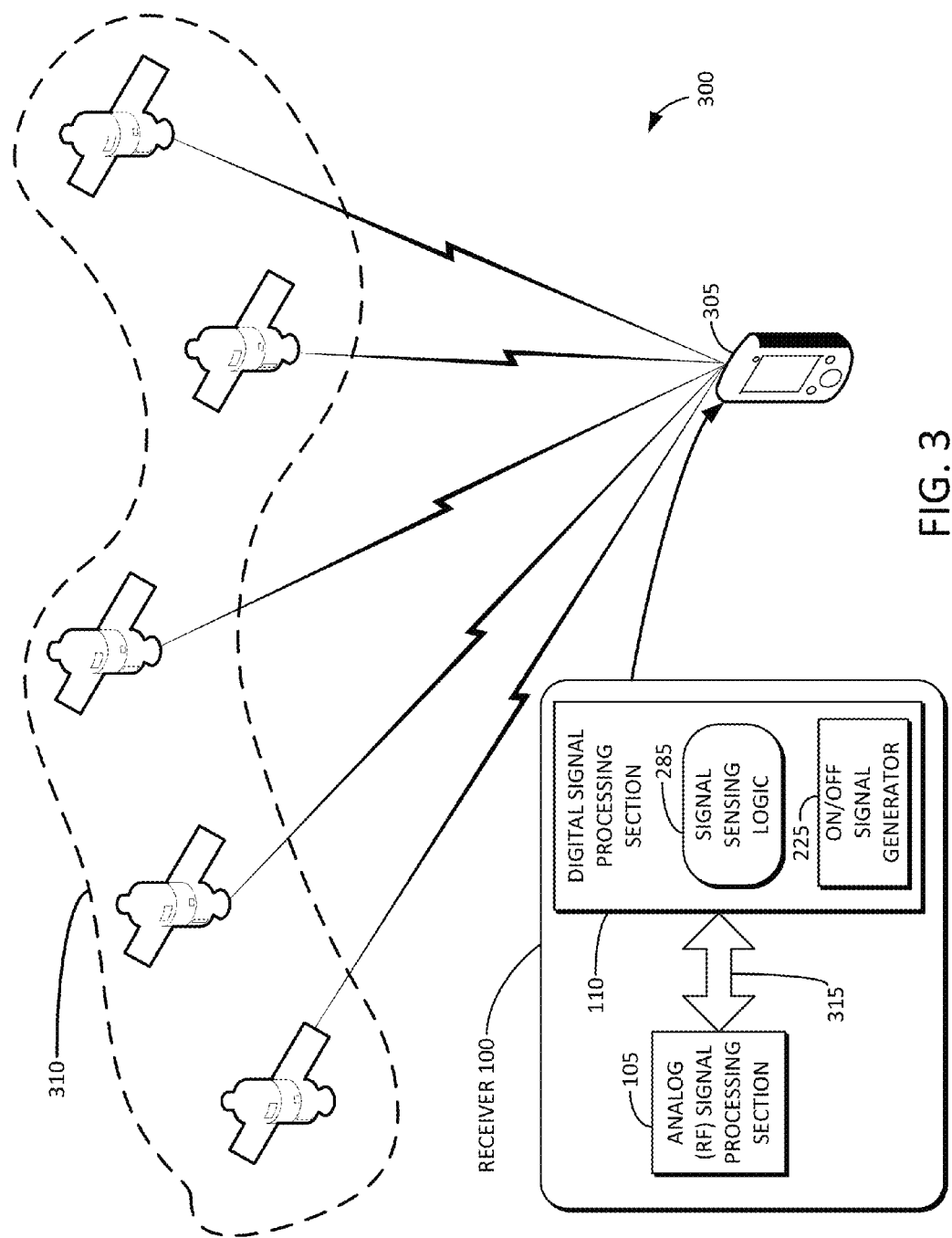
FIG. 3 is an example system diagram of a mobile device having embedded therein an electronic GNSS receiver, and a constellation of in-view satellites, in accordance with embodiments of the inventive concept.

FIG. 3 is an example system diagram 300 of a mobile device 305 having embedded therein an electronic GNSS receiver 100, and a constellation of in-view satellites 310, in accordance with embodiments of the inventive concept. The in-view satellites 310 may be comprised, for example, of as many as sixty (60) satellites from various GNSS systems.

This number will likely expand in the future. The receiver 100 can include the RF signal processing section 105 and the digital signal processing section 110, among other components described above. The digital signal processing section 110 may include the ON/OFF signal generator 225, the signal sensing logic 285, and other components as described above. An interface 315 connects the RF signal processing section 105 to the digital signal processing section 110.

Although illustrated as a smart phone 305, the mobile device 305 may be any kind of mobile device having a GNSS receiver embedded therein. The in-view satellites 310 can be associated with one or more satellite navigation systems including, for example, GPS, GLONASS, GALILEO, COMPASS, QZSS, SBAS, and the like. An increasing number of navigation system satellites are being launched into space over time, which provides more opportunity for obtaining a stronger position fix in accordance with the embodiments of the inventive concept disclosed herein.

Figure 4:
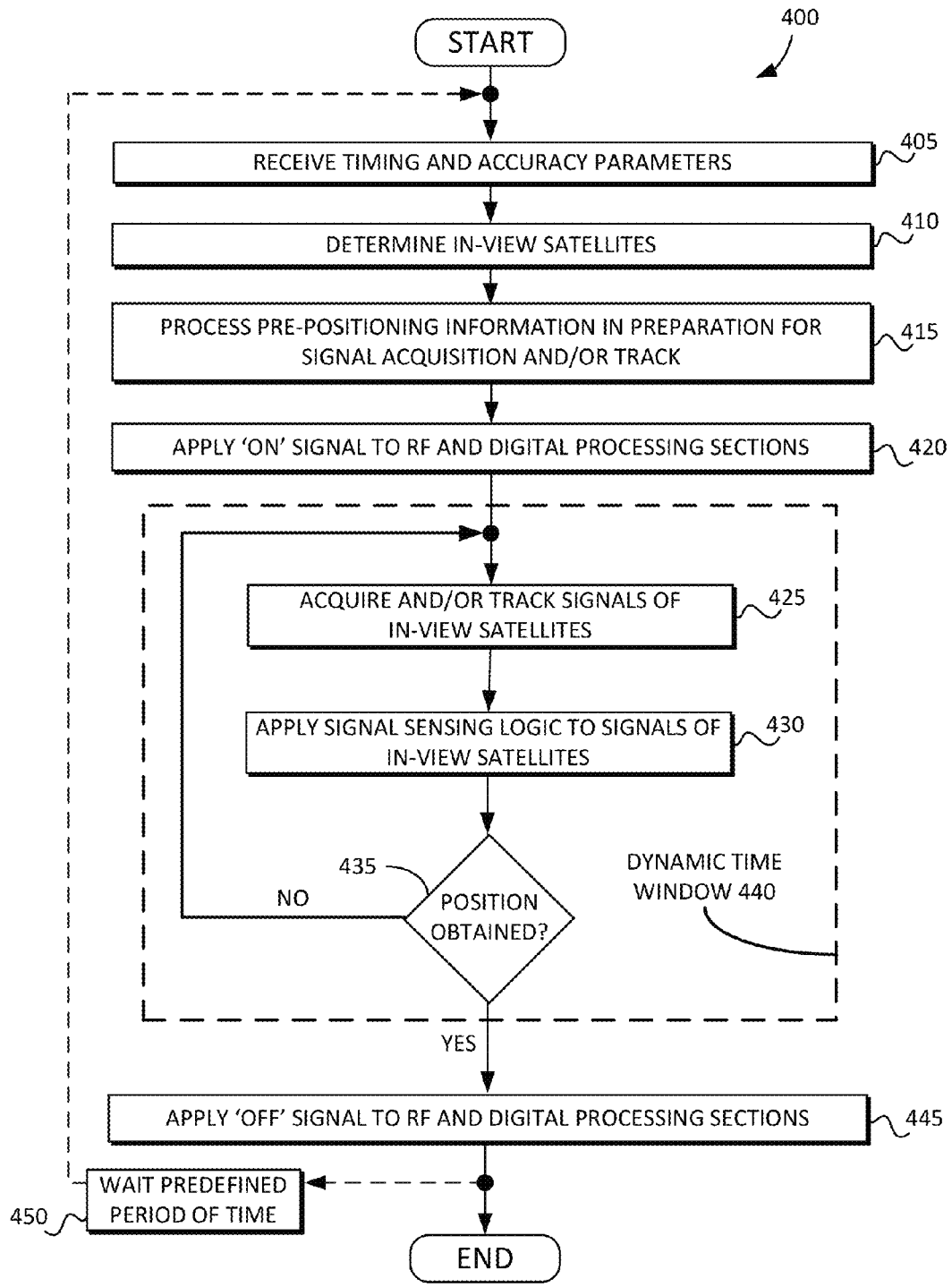
FIG. 4 is example flow diagram illustrating a technique for reducing power consumption in GNSS receivers in accordance with embodiments of the inventive concept.

FIG. 4 is example flow diagram 400 illustrating a technique for reducing power consumption in GNSS receivers in accordance with embodiments of the inventive concept. The technique begins at 405 where timing and accuracy parameters (e.g., 170 of FIG. 2) are received. The timing and accuracy parameters can include an "external position fix now" signal, position accuracy parameters, and the like. Such timing and/or accuracy parameters can be received from a source external to the receiver, or alternatively, may be generated internally, e.g., by repeatedly using the last received external information. The flow continues to 410 where in-view satellites are determined or otherwise computed.

At 415, pre-positioning information is processed in preparation for signal acquisition and/or signal track. The pre-positioning information (e.g., time and frequency) can be used to begin the process of acquisition and track with the initial emphasis on strong signal acquisition and track. By way of example, a 50 dB-Hz signal may be acquired and tracked with only 1 ms of satellite power observation. Acquisition and track can be performed on the same input samples such that acquisition and track are effectively done at the same time. The term "track" can refer to an actual attempt to form a closed loop track function (e.g., code and carrier tracking loops) and/or an open loop estimate of peak correlation time and carrier frequency offset.

The flow then proceeds to 420, where an ON command is generated, which causes the ON/OFF signal generator to apply an ON signal to the RF processing section (or one or more components thereof) and the digital processing section (or one or more components thereof).

Within a dynamic time window 440, signals of in-view satellites are acquired and/or tracked at 425. At 430, signal sensing logic is applied to the signals of the in-view satellites. At 435, a determination is made whether a position fix has been obtained. If NO, the flow returns and repeats 425 and 430 until a position fix is determined to be obtained. The receiver can apply the signal sensing logic, and in some cases, particularly where satellite signals are relatively strong, the position fix can be obtained within a short time interval (e.g., 1 ms). The signal sensing logic and/or algorithms determine whether the receiver has gathered enough information to provide a position output estimate that meets the position error parameters.

When the determination at 435 is YES (i.e., the position fix has been obtained), the flow proceeds to 445, where an OFF command is generated, which causes the ON/OFF signal generator to apply an OFF signal to the RF processing section (or one or more components thereof) and the digital processing section (or one or more components thereof). In other words, responsive to the determination that the position fix is obtained, the OFF signal is applied to the one or more components of the analog signal processing section and to the one or more components of the digital signal processing section. The position fix may then be output to the user (e.g., as part of output 180). The acquiring, applying, and determining may be performed based on the timing and accuracy parameters received at 405.

As mentioned above, the dynamic time window 440 is a non-fixed period of time, and the signal sensing logic is repeatedly applied in real-time until the position fix is obtained. In some embodiments, the signal sensing logic is simultaneously applied, in real-time, to all signals of in-view satellites within the dynamic time window 440 until the position fix is determined to be obtained. In some embodiments, the signal sensing logic can employ back-off compute intelligence. In other words, an initial burst of signal sensing activity can be followed by gradually decreasing amounts of signal sensing logic activity within the dynamic time window 440, thereby further reducing power consumption without significantly sacrificing the ability to obtain a position fix quickly and efficiently.

After applying the OFF signal, the receiver can wait a predefined period of time at 450, after which the flow can return to 405 and subsequent steps for further processing. More specifically, additional timing and accuracy parameters can optionally be received at 405, a second group of in-view satellites can be determined at 410, the processing at 415 can be performed, a second ON signal can be applied at 420, and within a second dynamic time window 440, the signals of the second group of in-view satellites can be acquired and/or tracked at 425, and the signal sensing logic can be applied at 430 to the signals of the second group of in-view satellites. As previously explained above, at 435, a determination is made whether a position fix has been obtained. If NO, the flow returns and repeats 425 and 430 until a position fix is determined to be obtained based on the second group of in-view satellites.

It will be understood that the elements and determinations in the flow diagram 400 need not occur in the specific order as described, but rather, such elements and determinations can be made at different times or in a different order.

Figure 5:
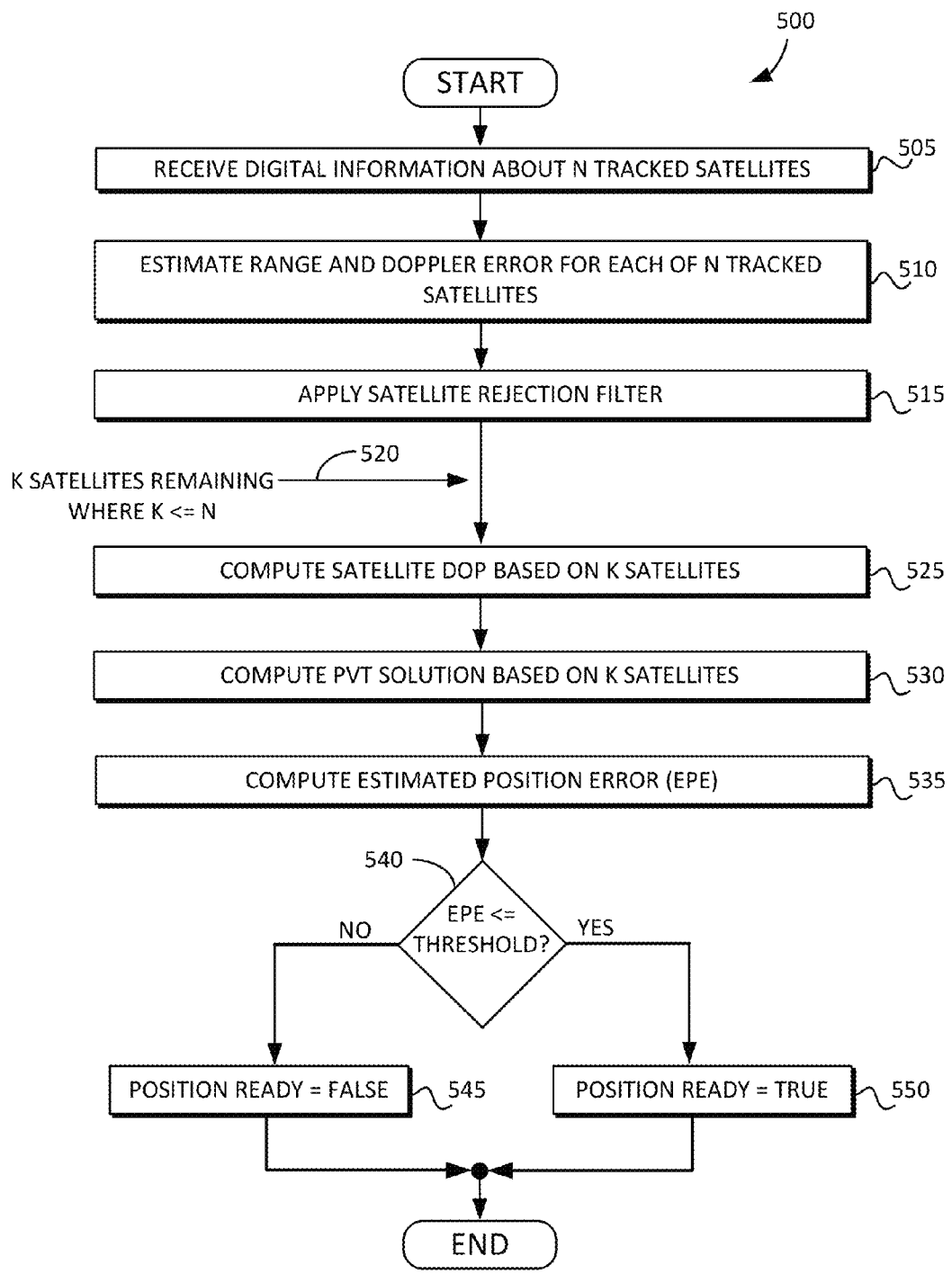
FIG. 5 is another example flow diagram illustrating a technique for applying satellite sensing logic to reduce power consumption in GNSS receivers in accordance with embodiments of the inventive concept.

FIG. 5 is another example flow diagram 500 illustrating a technique for applying satellite sensing logic to reduce power consumption in GNSS receivers in accordance with embodiments of the inventive concept. The technique begins at 505, where digital information is received about N tracked satellites, where the N tracked satellites correspond to the in-view satellites. A signal power detect threshold having a relatively high probability of discriminating between background noise and the satellite signal itself can be used to improve the accuracy of the N tracked satellites. The carrier-to-receiver noise density (CNO) for each satellite can be estimated based on the peak signal power found to noise ratio (i.e., the noise can be computed separately from the peak power via a noise channel).

At 510, satellite range and Doppler error can be estimated for each of the N tracked satellites. The satellite range and Doppler estimates can be made via satellite tracking or open loop interpolation to find a peak signal power bin in the two dimensional time and frequency space. At 515, a satellite rejection filter is applied to any signal identified as false tracks, where false track may be due to interference or cross-correlation between satellite sources. This leaves K satellites remaining (as illustrated at 520) with measurements available, where K is less than or equal to N. In other words, the satellite rejection filter can reject certain satellites due to interference tracking, cross correlation track, or the like, as also discussed above.

The flow proceeds to 525, where satellite dilution of precision (DOP) can be computed based on the K satellites. The satellite DOP may include geometric DOP (GDOP), horizontal DOP (HDOP), vertical DOP (VDOP), and/or time DOP (TDOP). A combination of individual satellite CNO (and potentially multi-path estimates) and the combined DOP can be used to estimate position error. At 530, position-velocity-time (PVT) solutions can be computed based on the K satellites. The PVT solutions can include, for example, Least Squares, Kalman Filter, or other suitable navigation solutions. Kalman filter solutions have the advantage of providing a filtered (i.e., over time) navigation solution, thereby reducing navigation errors. The Kalman Filter, for example, need not run more often to be effective, but rather, it can be run simultaneously on multiple satellite signals to further enhance the noise reduction.

At 535, the estimated position error (EPE) is computed. The EPE may be limited to particular dimensions, e.g., horizontal EPE only, vertical EPE only, and so forth. A determination is made at 540 whether the calculated EPE is less than or equal to a predefined threshold. If NO, (i.e., the EPE exceeds the predefined threshold), then the position ready status is determined to be false, or in other words, not ready. A corresponding position not-ready signal can be generated at 545. Otherwise, if YES (i.e., the EPE is less than or equal to the predefined threshold), then the position ready status is determined to be true, or in other words, ready. A corresponding position ready signal can be generated at 550.

It will be understood that the elements and determinations in the flow diagram 500 need not occur in the specific order as described, but rather, such elements and determinations can be made at different times or in a different order.

FIGS. 6-9 show approximate range error standard deviation estimates over a range of carrier-to-receiver noise density (CNO) values for various signal observation times. The horizontal axis in each of FIGS. 6-9 represents various CNO values (db-Hz). The vertical axis in each of FIGS. 6-9 represents various standard deviation of range error measurements (in meters).

Figure 6:
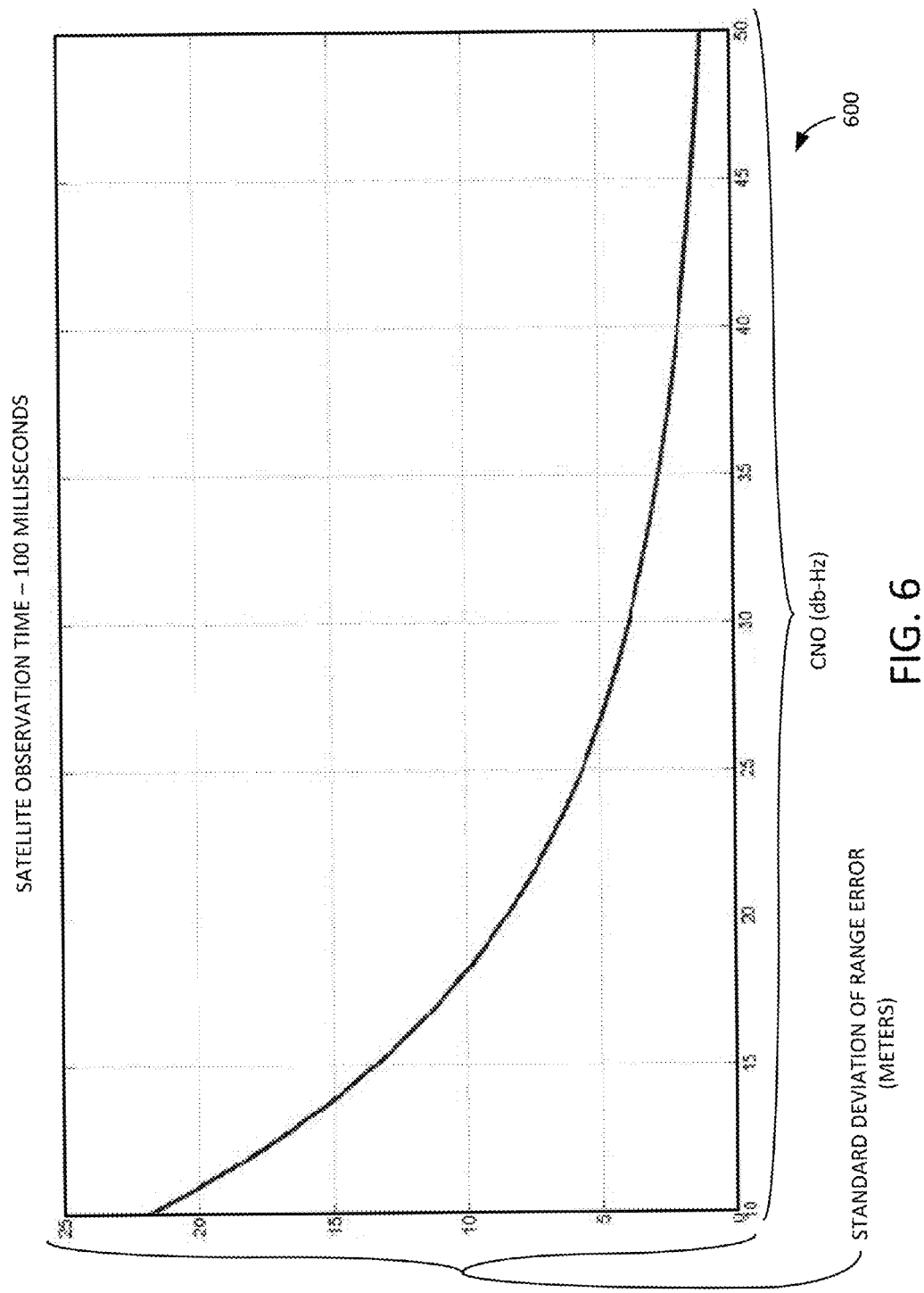
FIGS. 6-9 show approximate range error standard deviation estimates over a range of carrier-to-receiver noise density (CNO) values for various signal observation times.
Figure 7:
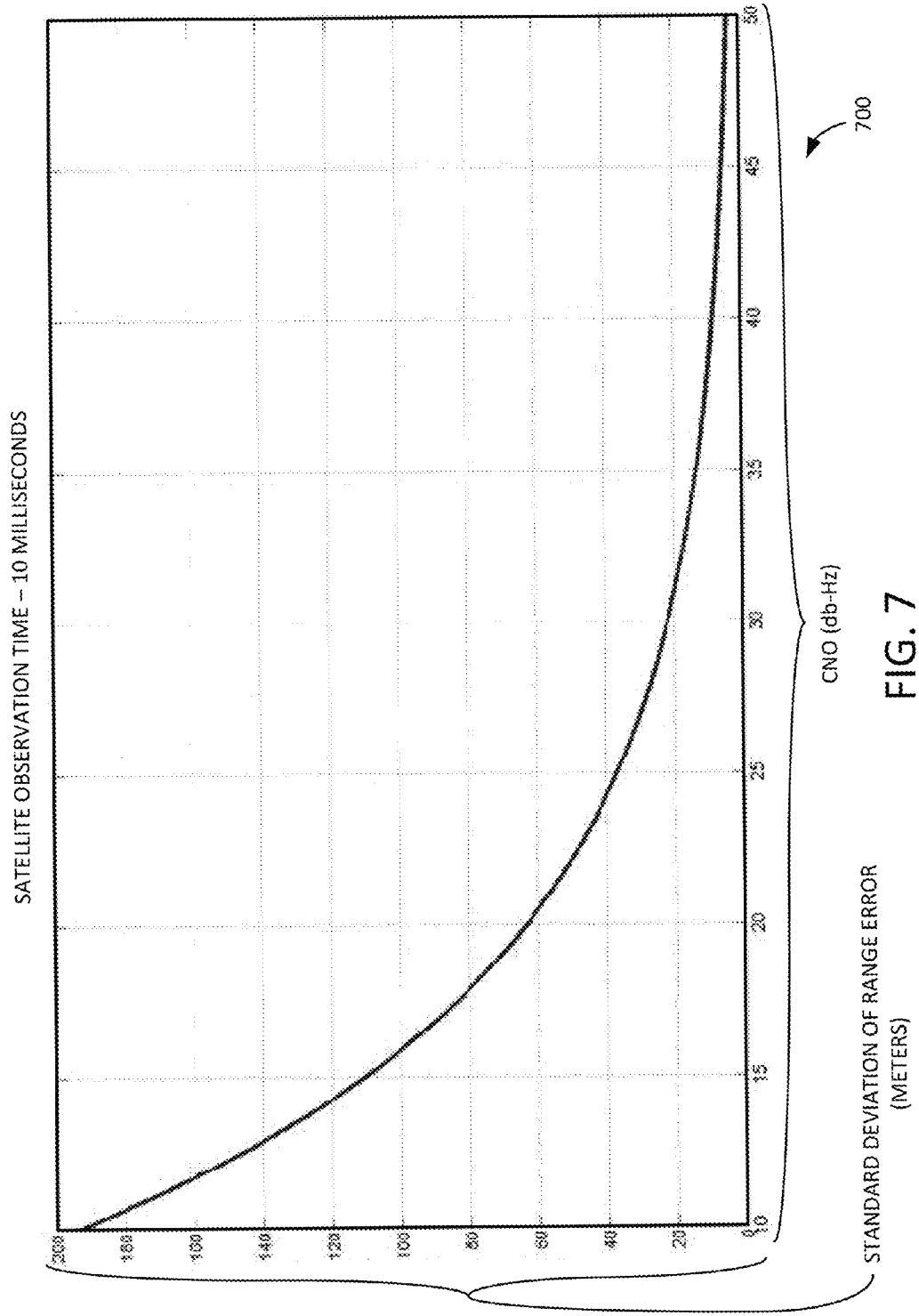
Figure 8:
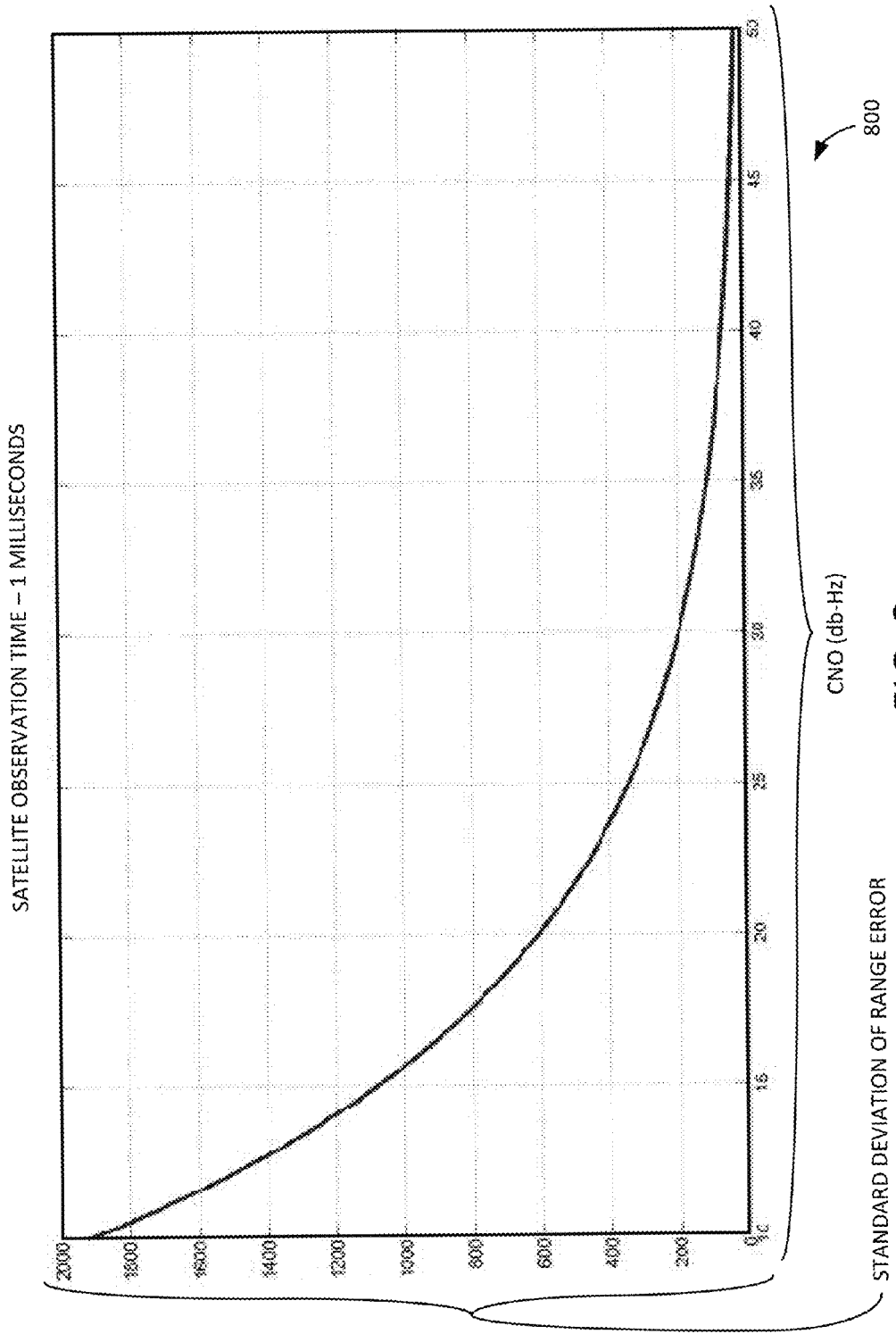
Figure 9:
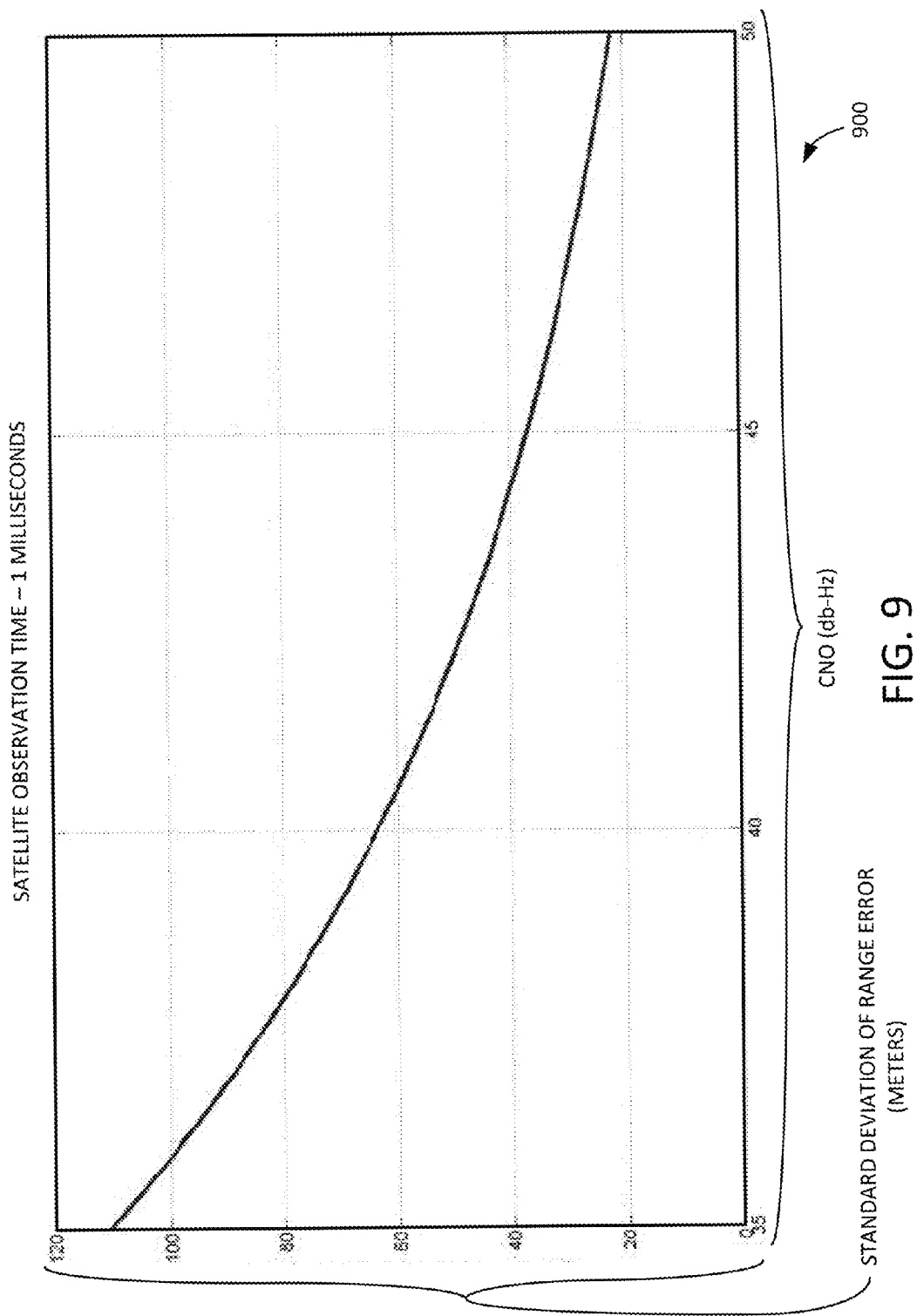

FIG. 6 illustrates a graph 600 representing a signal observation time of 100 ms. FIG. 7 illustrates a graph 700 representing a signal observation time of 10 ms. FIG. 8 illustrates a graph 800 representing a signal observation time of 1 ms. FIG. 9 illustrates a graph 900 that is zoomed on a portion of the graph 800 of FIG. 8, and also represents a signal observation time of 1 ms.

The receiver 100 may store curves and related information associated with graphs 600, 700, 800, and/or 900. The curves may be stored in the receiver, for example, in table or formula form. The curves may be stored in a volatile or non-volatile memory device, or other suitable storage device, within the receiver. The signal sensing logic can access such stored curve information to assist in the determination of whether a position fix is obtained.

FIG. 6-8 show that range error is a function of signal power available (e.g., CNO). This in turn impacts the navigation solution accuracy (nominally via a DOP multiplication factor).

By way of example, FIG. 8 shows that in order to achieve extremely short ON times (e.g., 1 ms), the CNOs must be high enough (e.g., 50 db-Hz) for enough satellites (where "enough" may be as few as 3 or 4 satellites combined to give sufficient DOP), otherwise signal observation can continue to achieve better measurement estimates, which in turn leads to a better navigation solution or position fix.

The GNSS receiver 100 is designed with sufficient throughput to keep up with the demand for creating signal detection hypothesis for all satellites that are in-view. Keeping all signal detection hypothesis integrating until the position solution is found. Signal detection thresholds can be predefined for a given signal integration period.

Figure 10:
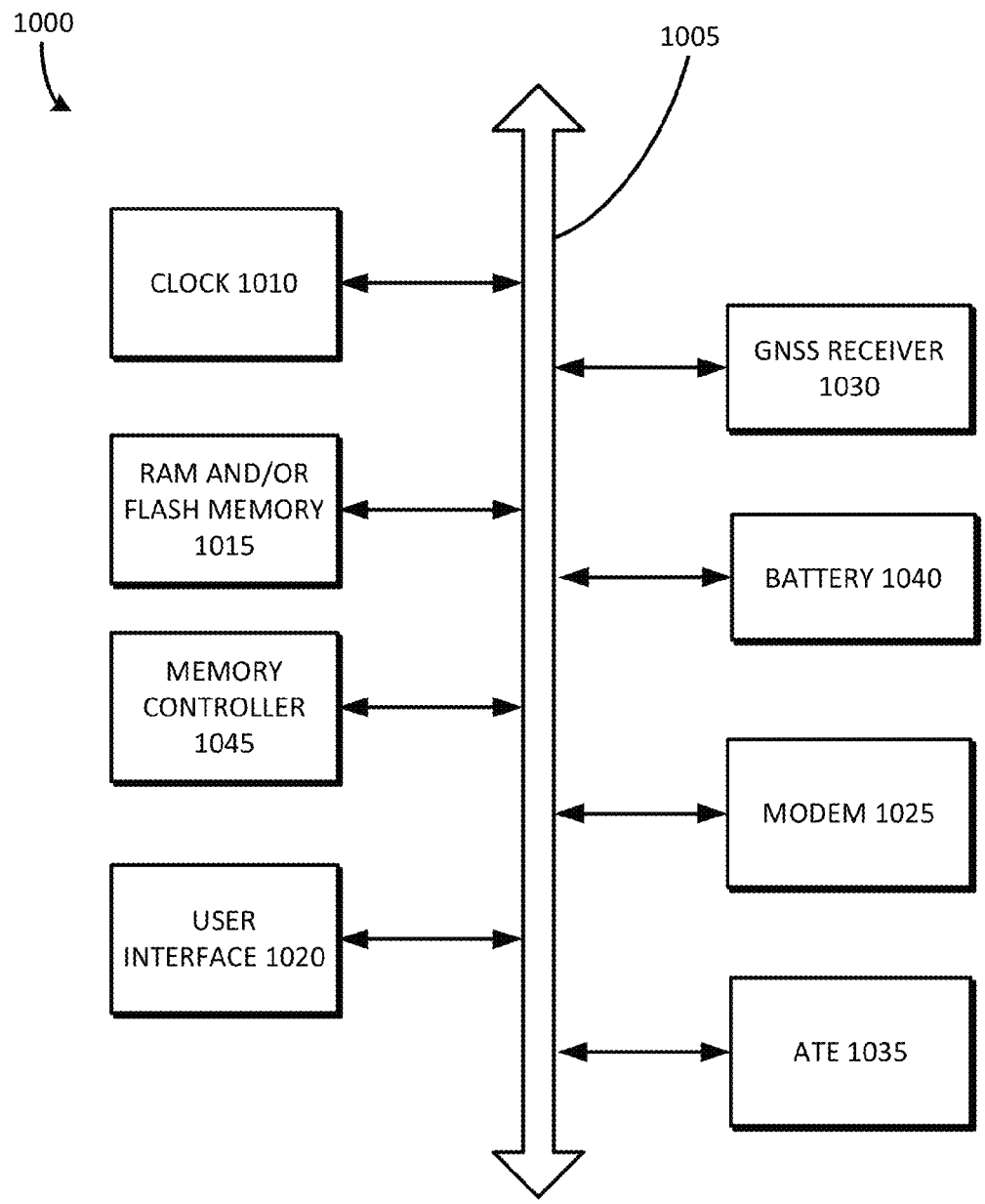
FIG. 10 is an example block diagram of a computing system including a GNSS receiver according to embodiments of the inventive concept as disclosed herein.

FIG. 10 is an example block diagram of a computing system 1000 including a GNSS receiver 1030 according to embodiments of the inventive concept as disclosed herein. The GNSS receiver 1030 may be electrically connected to a system bus 1005. The computing system 1000 may also include a clock 1010, a random access memory (RAM) and/or flash memory 1015, a memory controller 1045, a user interface 1020, a modem 1025 such as a baseband chipset, and/or automated test equipment (ATE) 1035, any or all of which may be electrically coupled to the system bus 1005.

If the computing system 1000 is a mobile device, it may further include a battery 1040, which powers the computing system 1000. Although not shown in FIG. 10, the computing system 1000 may further include an application chipset, a camera image processor (CIS), a mobile DRAM, and the like. The memory controller 1045 and the flash memory 1015 may constitute a solid state drive/disk (SSD), which uses a nonvolatile memory to store data.

In example embodiments, the computing system 1000 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

Embodiments of the inventive concept can be used, for example, in push-to-fix applications, continuous navigation applications, indoor navigation technologies, outdoor navigation technologies, and the like. The signal sensing logic can employ back-off compute time intelligence to further reduce power consumption. The dynamic (e.g., "as-needed") approach to obtaining the position fix within a variable timed window counter-intuitively reduces the overall time the receiver spends in the ON state, thereby reducing overall power consumption of the receiver.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

The foregoing illustrative embodiments are not to be construed as limiting the invention thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A method for reducing power consumption of a Global Navigation Satellite System (GNSS) receiver, the method comprising:
    determining whether a first plurality of satellites are in-view;
    applying a first ON signal to one or more components of an analog signal processing section and to one or more components of a digital signal processing section of the electronic receiver;
    within a first dynamic time window, acquiring first signals of the first plurality of in-view satellites and applying signal sensing logic to the acquired first signals, until determining that a first position fix of the electronic receiver is obtained;
    responsive to applying an OFF signal, waiting a predefined period of time;
    applying a second ON signal to the one or more components of the analog signal processing section and to the one or more components of the digital signal processing section; and
    after the predefined period of time, within a second dynamic time window, acquiring second signals of a second plurality of in-view satellites and applying the signal sensing logic to the acquired second signals, until determining that a second position fix of the electronic receiver is obtained.

2. The method of claim 1, further comprising:
    repeating, within the first dynamic time window, the acquiring of the first signals of the first plurality of in-view satellites and the applying of the signal sensing logic to the acquired first signals, until the first position fix is determined to be obtained.

3. The method of claim 2, wherein the first dynamic time window is a non-fixed period of time.

4. The method of claim 1, wherein applying the signal sensing logic further comprises simultaneously applying, in real-time, the signal sensing logic to all signals of the first plurality of in-view satellites within the first dynamic time window until the position fix is determined to be obtained.

5. The method of claim 1, further comprising:
    responsive to the determination that the first position fix is obtained, applying an OFF signal to the one or more components of the analog signal processing section and to the one or more components of the digital signal processing section.

6. The method of claim 1, further comprising:
    prior to determining whether the first plurality of satellites are in-view, receiving timing and accuracy parameters; and
    wherein the acquiring, applying, and determining are performed based on the timing and accuracy parameters.

7. The method of claim 1, further comprising:
    prior to applying the first ON signal, processing pre-positioning information in preparation for at least one of signal acquisition or signal track.

8. The method of claim 1, wherein applying the signal sensing logic to the acquired first signals further comprises:
    receiving digital information about N tracked satellites, wherein the N tracked satellites correspond to the first plurality of in-view satellites;
    estimating at least one of range and Doppler error for each of the N tracked satellites;
    filtering the N tracked satellites to K satellites, where K is less than or equal to N;
    computing dilution of precision based on the K satellites;

computing position, velocity, and time solution based on the K satellites;
computing estimated position error; and
determining whether the estimated position error is less than or equal to a predefined threshold.

9. The method of claim 8, further comprising:
responsive to the estimated position error being less than or equal to the predefined threshold, generating a position ready signal; and
responsive to the estimated position error being greater than the predefined threshold, generating a position not-ready signal.

10. The method of claim 8, wherein applying the signal sensing logic further comprises simultaneously applying, in real-time, the signal sensing logic to signals of the K satellites within the first dynamic time window until the first position fix is determined to be obtained.

11. A digital signal processing section operable within a Global Navigation Satellite System (GNSS) receiver apparatus, the digital signal processing section comprising:
a digital pre-processing section configured to receive digital information about first N tracked satellites;
a satellite rejection filter configured to filter the first N tracked satellites to first K satellites;
an ON/OFF signal generator configured to generate a first ON control signal to one or more components of the digital signal processing section; and
a satellite acquisition, tracking, and measurement section configured to apply, responsive to the first ON control signal, within a first dynamic time window, signal sensing logic to acquired first signals of the first K satellites, until a first position fix of the electronic receiver apparatus is obtained;
wherein:
the digital pre-processing section is configured to receive digital information about second N tracked satellites;
the satellite rejection filter is configured to filter the second N tracked satellites to second K satellites;
the ON/OFF signal generator configured to generate a second ON control signal to one or more components of the digital signal processing section; and
the satellite acquisition, tracking, and measurement section is configured to apply, responsive to the second ON control signal, within a second dynamic time window, signal sensing logic to acquired second signals of the second K satellites, until a second position fix of the electronic receiver apparatus is obtained.

12. The digital signal processing section of claim 11, wherein the first dynamic time window is a non-fixed period of time.

13. The digital signal processing section of claim 11, wherein the satellite acquisition, tracking, and measurement section is configured to determine, within the first dynamic time window, that the first position fix of the electronic receiver is obtained.

14. The digital signal processing section of claim 11, wherein the ON/OFF signal generator is connected to the one or more components of the digital signal processing section, and is configured to generate the first ON control signal at the beginning of the first dynamic time window and an OFF control signal at the end of the first dynamic time window.

15. The digital signal processing section of claim 14, wherein the one or more components of the digital signal processing section are configured to turn on responsive to the first ON control signal and to turn off responsive to the OFF control signal.

16. The digital signal processing section of claim 11, wherein the satellite acquisition, tracking, and measurement section is configured to simultaneously apply, in real-time, the signal sensing logic to the acquired first signals of the first K satellites within the first dynamic time window until the first position fix is determined to be obtained.

17. A system for reducing power consumption of a receiver, the system comprising:
a system bus;
memory connected to the system bus;
a user interface associated with the system bus and the memory; and
a Global Navigation Satellite System (GNSS) receiver including an RF processing section connected to a digital signal processing section, the digital signal processing section configured to receive digital information about first N tracked satellites and second N tracked satellites from the RF processing section, wherein the digital signal processing section further includes:
a satellite rejection filter configured to filter the first N tracked satellites to first K satellites;
an ON/OFF signal generator configured to generate a first ON control signal to one or more components of the digital signal processing section; and
a satellite acquisition, tracking, and measurement section configured to apply, responsive to the first ON control signal, within a first dynamic time window, signal sensing logic to acquired first signals of the first K satellites, until a first position fix of the electronic receiver apparatus is obtained;
wherein:
the satellite rejection filter is configured to filter the second N tracked satellites to second K satellites;
the ON/OFF signal generator configured to generate a second ON control signal to one or more components of the digital signal processing section; and
the satellite acquisition, tracking, and measurement section is configured to apply, responsive to the second ON control signal, within a second dynamic time window, signal sensing logic to acquired second signals of the second K satellites, until a second position fix of the electronic receiver apparatus is obtained.

18. The system of claim 17, wherein the first dynamic time window is a non-fixed period of time.

19. The system of claim 17, wherein the satellite acquisition, tracking, and measurement section is configured to determine, within the first dynamic time window, that the first position fix of the electronic receiver is obtained.

20. The system of claim 17, wherein the ON/OFF signal generator is connected to the one or more components of the digital signal processing section, and is configured to generate the first ON control signal at the beginning of the first dynamic time window and an OFF control signal at the end of the first dynamic time window.

21. The system of claim 20, wherein the one or more components of the digital signal processing section are configured to turn on responsive to the first ON control signal and to turn off responsive to the OFF control signal.

22. The digital signal processing section of claim 17, wherein the satellite acquisition, tracking, and measurement section is configured to simultaneously apply, in real-time, the signal sensing logic to the acquired first signals of the first K satellites within the first dynamic time window until the first position fix is determined to be obtained.

23. A method for reducing power consumption of a Global Navigation Satellite System (GNSS) receiver, the method comprising:
- determining a plurality of satellites with a desired strength by a receiver;
- receiving a desired position error threshold;
- turning on one or more components of an analog signal processing section and a digital signal processing section of the receiver;
- acquiring a signal of the plurality of satellites;
- determining a position estimate of the receiver based on applying signal sensing logic to the signal; and
- turning off the one or more components of the analog signal processing section and the digital signal processing section of the receiver based on the position estimate satisfying the desired position error threshold.

* * * * *